United States Patent [19]

Rajagopal

[11] Patent Number: 4,557,372
[45] Date of Patent: Dec. 10, 1985

[54] BELT SYSTEM WITH ALIGNMENT APPARATUS

[75] Inventor: Ganesh Rajagopal, Richardson, Tex.

[73] Assignee: The Mead Corporation, Dayton, Ohio

[21] Appl. No.: 640,274

[22] Filed: Aug. 13, 1984

[51] Int. Cl.⁴ .......................................... B65G 39/16
[52] U.S. Cl. ................................. 198/807; 474/103; 242/57.1
[58] Field of Search ............................ 198/807, 806; 474/102–104, 123, 126; 242/57.1; 226/3, 15, 16

[56] References Cited

U.S. PATENT DOCUMENTS

| 1,972,075 | 9/1934 | Clark | 242/57.1 |
|---|---|---|---|
| 2,078,669 | 4/1937 | King | 242/76 |
| 2,344,817 | 3/1944 | Hlavaty | 74/241 |
| 2,356,567 | 8/1944 | Cockrell | 474/103 X |
| 3,322,963 | 5/1967 | Pages | 250/219 |
| 3,323,699 | 6/1967 | Bricker, Jr. | 242/57.1 |
| 3,323,740 | 6/1967 | Blessing | 242/57.1 |
| 3,366,876 | 1/1968 | Kurih et al. | 242/57.1 |
| 3,604,941 | 9/1971 | Crum | 250/219 |
| 3,627,301 | 12/1971 | Benson et al. | 242/57.1 X |
| 3,701,464 | 10/1972 | Crum | 101/248 X |
| 3,721,809 | 3/1973 | Strandberg, Jr. et al. | 242/57 |
| 3,896,377 | 7/1975 | Richardson | 324/161 |
| 3,963,902 | 6/1976 | Dowd | 235/92 |
| 4,049,213 | 9/1977 | Hank et al. | 242/57.1 |
| 4,462,676 | 7/1984 | Shimura et al. | 198/806 X |
| 4,485,982 | 12/1984 | St. John et al. | 242/57.1 |
| 4,500,045 | 2/1985 | Whitaker et al. | 242/57.1 |

FOREIGN PATENT DOCUMENTS

| 553852 | 3/1958 | Canada | 474/105 |
|---|---|---|---|
| 760829 | 6/1967 | Canada | 242/57.1 |
| 1180048 | 6/1959 | France | 198/806 |
| 367928 | 3/1932 | United Kingdom | 474/103 |

Primary Examiner—Joseph E. Valenza
Assistant Examiner—Michael Stone
Attorney, Agent, or Firm—Biebel, French & Nauman

[57] ABSTRACT

A belt system of the type having a transparent belt entrained about a pair of support rollers which includes an improved alignment apparatus having a plurality of opaque flags positioned along an edge of the belt and shaped to taper in a transverse dimension, an encoder for detecting movement of the belt about the rollers and generating a signal proportional in frequency to the speed of the belt, a fixed photodetector which senses the passage of a portion of the flag through a narrow window so that the time of passage is determined by the position of the belt and flag relative to the sensor, an adjusting roller actuated by a stepper motor which laterally positions the belt relative to the support rollers, and a microprocessor which determines the position of the belt from the number of pulses generated during a period of time in which the sensor detects the passage of a flag and actuates the stepper motor to position the tracking roller to shift the belt laterally in response to the number of pulses counted. In a preferred embodiment, a timer introduces a time delay between successive counting periods, the time delay varying in duration inversely with the amount of lateral deviation of the belt from its desired position.

7 Claims, 8 Drawing Figures

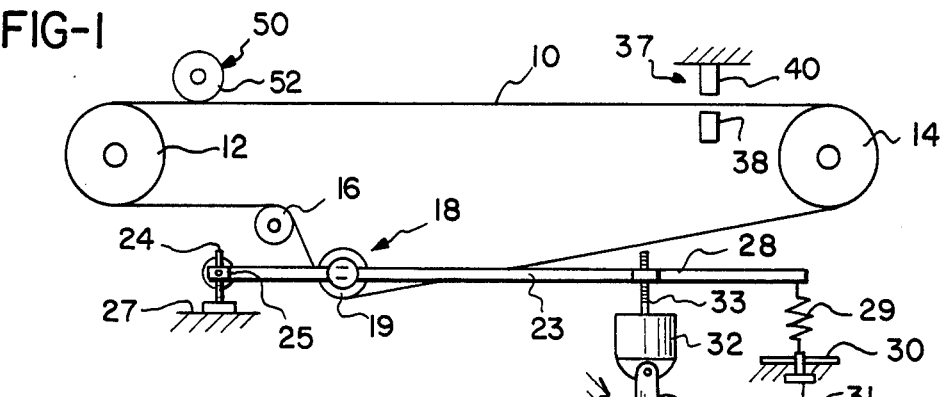
FIG-1
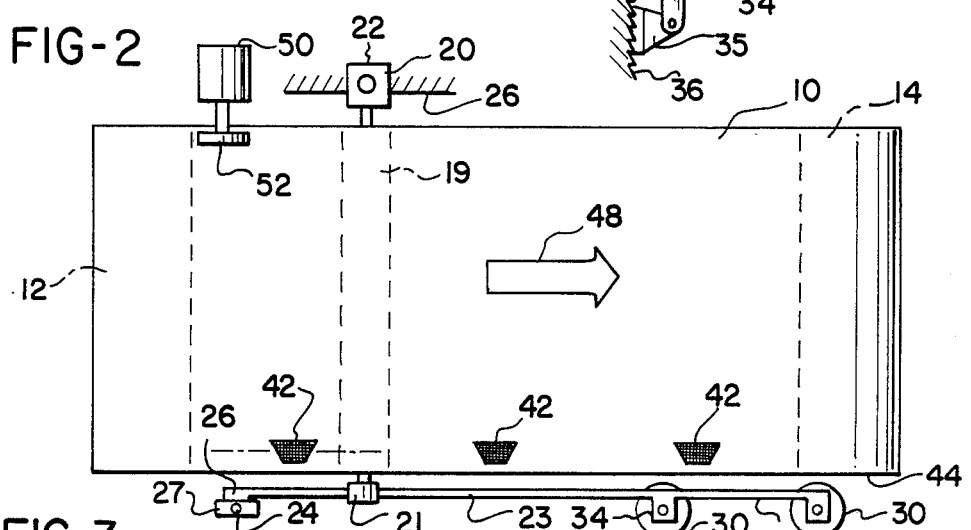
FIG-2
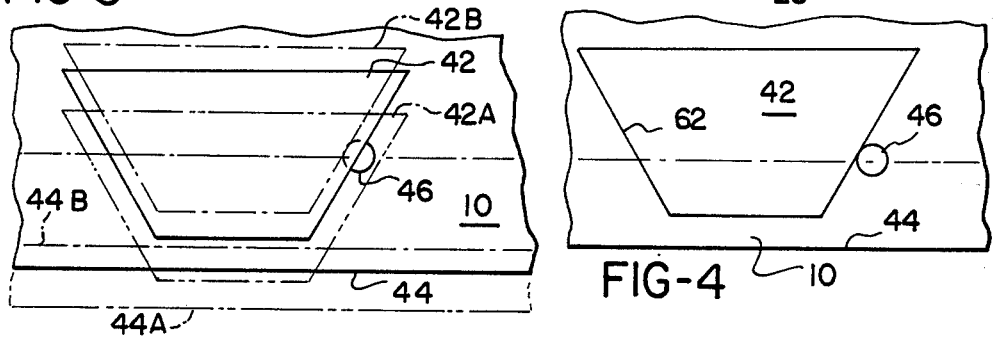
FIG-3
FIG-4
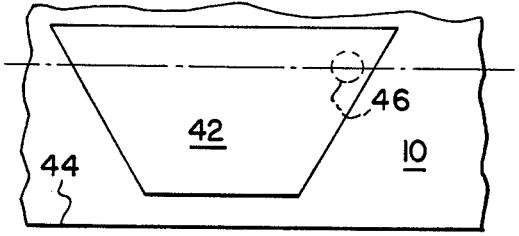
FIG-5

BELT SYSTEM WITH ALIGNMENT APPARATUS

BACKGROUND OF THE INVENTION

The present invention relates to belt systems having belt alignment apparatuses and, more particularly, to belt systems utilizing relatively flexible, transparent belts and having tracking assemblies capable of compensating for lateral deviations in the position of the belt.

There are certain applications in the ink jet printing field where it is desirable to transport sheets of paper by means of a conveyor system which incorporates a belt made of a polyester film such as Mylar (a registered trademark of E. I. DuPont de Nemours & Co.). A conveyor using a Mylar belt is capable of transporting sheets of paper relatively close to the rods of a radio frequency ink dryer so that the intensity of the electric field passing through the ink particles on the paper is maximized. Another advantage of using Mylar belts is that they are relatively inexpensive when compared to belts of other materials.

A problem inherent in the use of conveyor belts made of Mylar is that such belts tend to move laterally relative to the cylindrical rollers which support them. Without constant realignment, the lateral movement of the belt after prolonged use would cause the belt to move sidewardly against supporting structure and possibly become damaged. Accordingly, with such belt systems it is necessary to provide some form of belt alignment apparatus.

Many types of belt alignment apparatuses are known. For example, the Crum U.S. Pat. No. 3,701,464 discloses an apparatus for adjusting web position in a multi-color web-fed printing press to compensate for circumferential registration error and lateral registration error. With that system, each one of a multiple printing unit system imprints its associated web with a lateral and a circumferential reference mark. A plurality of photosensors are positioned across the width of the overlapping webs so that each sensor detects a passage of a particular reference mark. The timing of the passage of the reference marks is used to calculate the circumferential and lateral error. Stepper motors are actuated to adjust printing rolls to compensate for the error.

Another example is shown in the Benson et al U.S. Pat. No. 3,627,301. That patent discloses a stripe locator which locates the position of a stripe on a web of fabric passing beneath it. Light is shone through triangular openings on a stripe sensing head and is received by photocells. The light sources and photocells are grouped in pairs on either side of the stripe so that the intensity of light received by one photocell increases as the intensity of light received by the other photocell decreases. The difference in intensity is read by a computer which actuates a tracking roller.

The Bricker, Jr. U.S. Pat. No. 3,323,699 discloses a belt-adjusting mechanism in which a moving strip of magnetic material passes beneath capacitance plates which are trapezoidally-shaped and form capacitors with the strip. The plates are positioned on either side of the strip, and the capacitance of one plate increases as the capacitance of the other decreases. This difference in capacitance is read by a controller which uses that information to actuate a belt-adjusting mechanism.

A disadvantage with devices such as those disclosed in Crum and Benson are that elaborate systems are required to detect lateral movement of a belt, which would greatly increase the overall cost of the system in which they are employed. An additional disadvantage with the Bricker, Jr. device is that it requires the use of a belt made of a metallic material.

Other devices are known in which photocells are employed in a fixed position and a beam of light is directed perpendicularly to the plane of the belt. Lateral deviation of the belt breaks the light path, causing the photocell to generate a signal which is read by a controller that actuates a tracking mechanism. Examples of that type of tracking mechanism are shown in the patents to Pages, U.S. Pat. No. 3,322,963; Cockrell, U.S. Pat. No. 2,356,567; Hlavaty, U.S. Pat. No. 2,344,817; and King, U.S. Pat. No. 2,780,669.

A disadvantage with these types of tracking mechanisms is that two separate systems are required to detect lateral movement of a belt; one for deviation in each lateral direction. Furthermore, such devices are not accurate enough to detect the relatively small-scale lateral deviations of a Mylar belt of a size used in an ink jet printing machine.

Accordingly, there is a need for a belt system having a tracking mechanism which is relatively simple in construction and economical to implement in a printing machine. Furthermore, such a tracking mechanism should be capable of use with less expensive Mylar belts. In addition, the tracking mechanism should be sufficiently sensitive to detect relatively small-scale movement of the belt in either lateral direction.

SUMMARY OF THE INVENTION

The present invention is a belt system of the type having a transparent belt entrained about a pair of support rollers and includes a photodetector mechanism which senses the position of a plurality of flags mounted on the belt and thereby determines the lateral position of the belt. In response to signals from the photodetector, a microprocessor generates a stepper motor drive control signal which actuates a stepper motor to displace a tracking roller an appropriate distance to move the belt laterally to a desired position on the support rollers.

The flags mounted on the belt taper in length in a lateral direction. The photodetector includes a light source and a detection window substantially narrower than the flags so that the period of time in which a portion of a flag passes by the window is dependent upon the position of the belt relative to the photodetector, as well as the speed of the belt.

An encoder is employed which generates a series of pulses having a frequency which is directly proportional to the speed of the belt, so that a relatively high frequency series of pulses is generated when the belt moves rapidly, and a relatively low frequency series of pulses is generated when the belt moves slowly. In this fashion, the same number of pulses are generated for a given amount of belt displacement, regardless of the belt speed.

The microprocessor controls a counter which counts the number of pulses that are generated by the encoder during the period of time a portion of a flag passes by the detection window of the photodetector and thereby breaks the light beam otherwise passing to the photodetector through the Mylar belt. The microcomputer generates a signal representative of the number of pulses counted which signal is passed to a stepper motor control circuit. The stepper motor control circuit actuates the stepper motor in response to the signal to rotate its output shaft clockwise or counterclockwise a predetermined number of steps to move the tracking roller appropriately to position the belt to a desired location on the support rollers.

In a preferred embodiment, the tracking roller is part of an adjusting mechanism and is pivotally and rotatably attached to a supporting surface within the printing machine housing the belt system. A lever arm is pivotally attached to a supporting surface within the machine and supports an opposite end of the tracking roller. The output shaft of the stepper motor is threaded into the lever arm such that rotation of the output shaft causes the lever arm to pivot upwardly or downwardly, thereby pivoting the tracking roller relative to the belt and support rollers. The biasing force exerted by the adjusting roller on the belt causes the belt to move laterally.

Also in the preferred embodiment, the microprocessor includes a timer which is programmed to introduce a time delay between successive counting operations. This delay is introduced to enable the belt-adjusting assembly to have sufficient time to effect a lateral shifting of the belt before the next adjustment is made and hence avoid any oscillatory hunting motions which might otherwise occur. Experiments have determined that the time delay should vary in duration inversely with the magnitude of the adjustment required. That is, relatively large time delays should be provided between relatively small adjustments, whereas relatively small time delays should be provided between relatively large adjustments. It is also desirable to program the microprocessor to instruct the stepper motor control to actuate the stepper motor to rotate its output shaft a number of steps that increases with the amount of belt deviation perceived.

Accordingly, it is an object of the present invention to provide a belt system which is capable of utilizing a transparent belt of Mylar or the like and having a tracking mechanism capable of maintaining the belt at a proper location on support rollers; a belt system having a tracking mechanism which is relatively simple in operation and economical to construct; and a belt tracking mechanism which is capable of making relatively small-scale adjustments to belt position.

Other objects and advantages of the invention will be apparent from the following description, the accompanying drawings and the appended claims.

BRIEF DESCRIPTION OF THE DRAWINGS

FIG. 1 is a schematic side elevation of the belt system of the preferred embodiment;

FIG. 2 is a top plan view of the belt system of FIG. 1;

FIG. 3 is a detail of the belt system of FIG. 1 showing the shifting of a flag which occurs with lateral deviation of belt position;

FIG. 4 is a detail of the belt system shown in FIG. 3 in which the belt is shifted to the left of the desired position shown in FIG. 2;

FIG. 5 is a detail of the belt system showing the belt shifted to the right of the desired position shown in FIG. 2;

DETAILED DESCRIPTION OF THE PREFERRED EMBODIMENT

Figure 6:
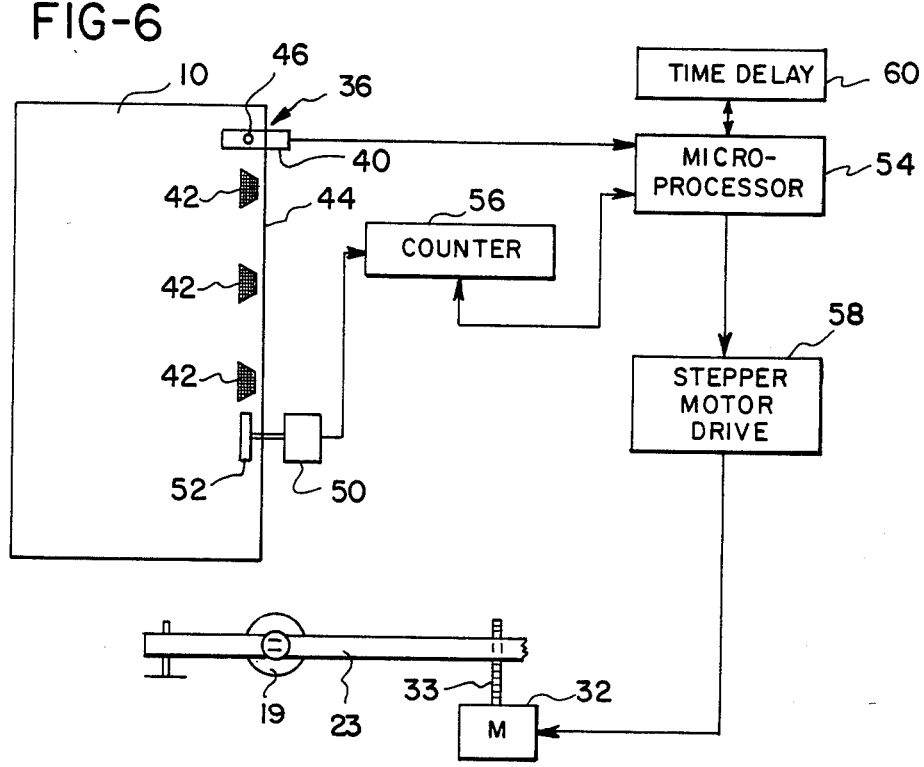
FIG. 6 is a schematic diagram showing a control unit for the system shown in FIG. 1.

As shown in FIGS. 1 and 2, the belt system of the present invention includes a continuous belt 10 made of a relatively thin (about 0.004 inch thick) polyester film such as Mylar entrained about a support roller 12, drive roller 14, and idler roller 16. The belt system includes a belt-adjusting assembly for positioning the belt 10 laterally relative to the rollers 12, 14. The belt adjusting assembly includes a tracking mechanism, generally designated 18.

The tracking mechanism 18 includes a tracking roller 19 having spherical bearings 20, 21 at its ends. Spherical bearing 20 is attached to adjusting jack 22 and spherical bearing 21 is attached to a lever arm 23 which is pivotally attached at an end 24 to adjusting jack 25. Jack 22 is fixed to a supporting surface 26 and jack 24 is fixed to supporting surface 27. Jacks 22, 24 are adjustable to vary the position of roller 19 relative to rollers 12, 14, 16 to adjust the tension of the belt 10 to eliminate slippage.

An opposite end 28 of the arm 23 is connected to a balancing spring 29 which is adjustably attached to a supporting surface 30 by a tension adjusting screw 31. A stepper motor 32 has a threaded output shaft 33 which engages arm 23 and is connected by a link 34 to a saw tooth bracket 35 which clamps to a matingly-shaped saw tooth support 36.

Actuation of the stepper motor 32 rotates the shaft 33 which displaces the lever arm 23 upwardly or downwardly as shown in FIG. 1. This causes the end of the tracking roller 19 attached to the arm 23 to move upwardly or downwardly and apply a lateral force to the belt 10 which shifts the belt laterally relative to the supporting rolls 12, 14. Prior to operation, the motor 32 may be unclamped from the support 36 to enable the tension of spring 29 to be adjusted sufficiently to impose a predetermined amount of force on lever arm 23 to apply tension to belt 10, then reclamped. This allows a motor 32 to be used solely to position the end of the roller 19 to adjust the position of the belt 10, so that a relatively low torque motor may be used.

Once the belt 10 has been tightened on the rollers 12, 14, 16, 19 by adjustmemt of jacks 22, 24 and balancing spring 29, the stepper motor 32 may be used to laterally position the belt by vertical displacement of the tracking roller 19. Rotation of the output shaft 33 which pivots arm 23 upwardly elevates an adjacent portion of tracking roller 19, thereby reducing the tension of the corresponding side of the belt 10 so that the belt moves laterally toward arm 23. Conversely, rotation of shaft 33 to pivot arm 23 downwardly lowers the adjacent portion of roller 19 to increase the tension of the corresponding side of the belt 10 so that the belt moves laterally away from the arm. The spherical bearings 20, 21 ensure the smooth rotation of the roller 19 when skewed relative to supporting surfaces 26, 27.

With the aforementioned structure, the roller 19 and arm 23 would pivot in unison, so that the threaded connection between the arm and the output shaft 33 of the motor would be a pivotal connection.

The belt system also includes an optical sensing system, generally designated 37. The optical sensing system 37 includes a light source 38 which directs a beam of light (not shown) through the transparent belt 10 to a light sensor 40. The belt includes a plurality of flags 42 which are of identical trapezoid shape and are positioned on the belt 10 so that their lengths taper toward the edge 44 of the belt.

As shown in FIGS. 3, 4 and 5, the flags 42 are positioned on the belt 10 so that they pass between the light source 38 and the light sensor 40 (FIG. 1). The optical sensing system 37, which is well-known in the art, detects light through the belt 10 only in a relatively small window denoted by the circle 46. As driving roller 14 rotates and moves the belt in the direction of arrow 48 (FIG. 2), the flags 42 pass between the light source 38 and light sensor 40 at a particular point along the width of the flags which depends upon the relative position of the belt 10 on the rollers 12, 14.

As shown in FIG. 3, when the belt 10 is properly positioned on the support rollers 12, 14, the flags 42 pass through the light sensing system 36 such that the window 46 is traversed by the central portion of one of the flags 42, the outline of which is shown in solid in FIG. 3. Should the belt 10 become shifted to the right so that the edge of the belt is in the position shown by broken line 44A, the flag 42 shifts to the position shown by outline 42A so that the window 46 is traversed by a relatively longer portion of a flag 42.

Conversely, if the belt 10 is shifted to the left so that the edge 44 is in the position shown by broken line 44B, the window 46 is traversed by a relatively shorter segment of a flag 42, which is then in the position shown by the outline 42B. The segment of a flag 42 which traverses the window 46 when the belt is shifted to the right is shown more clearly in FIG. 5; when the belt is shifted to the left, the segment of the flag traversed by the window is shown more clearly in FIG. 4.

The belt system also includes an encoder 50 which includes a sensing wheel 52 that contacts the upper surface of the belt, shown in FIGS. 1 and 2. As the belt 10 is driven by drive roller 14, the sensing wheel 52 rotates to actuate the encoder 50 to generate a series of pulses having a frequency which is directly proportional to the speed of the belt 10 so that the number of pulses per unit length of the belt remains constant, regardless of belt speed.

An illustrative embodiment of a control unit for the belt system is shown in FIG. 6. The control unit includes a microprocessor 54 which receives a signal from the light sensor 40 and controls a counter 56 which is connected to receive pulses from the encoder 50. A stepper motor drive circuit 58 is also controlled by the microprocessor 54 and is connected to drive the stepper motor 30. The stepper motor drive circuit 58 actuates the stepper motor 30 to rotate the output shaft 32 a predetermined number of steps in a clockwise or counterclockwise direction depending upon the signal received from the microprocessor 54. In order to allow the tracking mechanism 18 sufficient time to effect a lateral shifting of the belt 10, the microprocessor 58 includes a timer 60, which is shown separate from the microprocessor but may be an integral part thereof, to introduce a delay of a selected time period between successive sensing and adjusting operations.

The operation of the belt system is as follows. The belt 10 is driven by the drive roller 14 at a predetermined speed. However, this speed may vary with time depending upon the application to which the belt is put. As the flags 42 on the moving belt 10 traverse the window 46 of the optical sensing system 37 and block the beam from the light source 38, a signal is generated by the light sensor 40 and detected by the microprocessor 54. The microprocessor 54 enables the counter 56 which begins counting pulses generated by the encoder 50.

As previously described, the encoder 50 generates pulses having a frequency which is directly proportional to the speed at which the belt 10 is traveling and hence the speed at which the sensing wheel 52 rotates. Thus, if the belt 10 is moving rapidly, the pulses generated by the encoder 50 are at a relatively high frequency; but when the belt is traveling relatively slowly, the sensing wheel 52 rotates slowly and the frequency of pulses produced by the encoder 50 is relatively low. The use of the encoder serves to stabilize the counts generated within the counter 56 since, for lower frequencies, the mark takes longer to traverse the optical sensing system 40 and, for higher frequencies, less time is required.

When the trailing edge 62 of the flag 42 (FIG. 4) passes the window 46, the light sensor 40 stops generating the signal to the microprocessor 54, and the microprocessor reads the count stored within the counter 56 and clears the counter. This value determines the type of stepper motor control signal which is sent by the microprocessor 54 to the stepper motor drive circuit 58. If relatively few pulses are counted during a counting period, i.e., the passage of one mark 42, this indicates that the belt is shifted to the left as shown in FIG. 6, since the length of the flag perceived by the window 46 is relatively short. The microprocessor 54 then signals the stepper motor drive circuit 58 to actuate the stepper motor 32 to rotate the shaft 33 by a corresponding number of steps clockwise to move the tracking roller 19 to displace the belt 10 the appropriate distance to the right.

Conversely, if a relatively large number of pulses are recorded by the counter 56, this indicates that the belt 10 is shifted to the right, as shown in FIG. 6, which would cause the window 46 to be traversed by a relatively long portion of the flag 42. The microprocessor 54 would read the relatively large count in the counter 56 and generate a stepper motor control signal to the stepper motor drive circuit 58 which would actuate the stepper motor 32 to rotate the shaft 33 by a corresponding number of steps counterclockwise to move the tracking roller 19 to displace the belt 10 the appropriate distance to the left.

The number of steps of the output shaft 33 of the stepper motor 32 necessary to displace the belt 10 a certain distance to the left or to the right of the desired location are dependent upon the physical size of the embodiment of the invention. Therefore, specific numbers for the number of steps of the output shaft 33 and the number of pulses counted by the counter 56 are not set forth herein as they would be meaningless without specific dimensions for the physical system.

Figure 7:
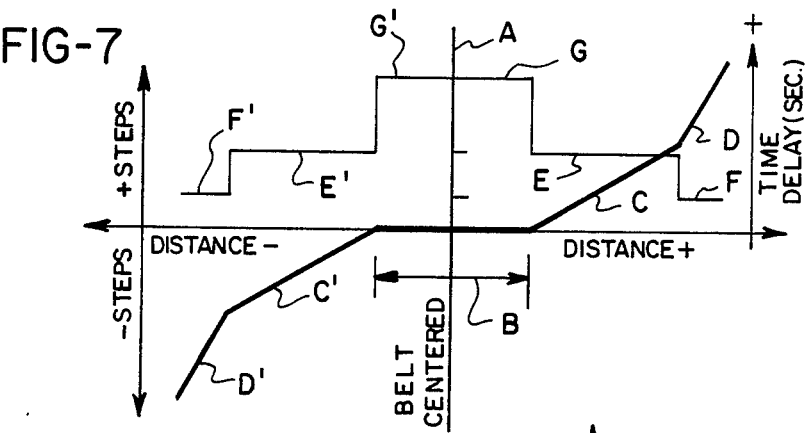
FIG. 7 is a graph showing the relation between belt deviation and the number of steps effected by the stepper motor, and the relation between the belt deviation and the time delay introduced by the microprocessor of the invention.

However, it is known that a relatively large number of steps is required for a relatively large displacement of the belt 10 from a desired position, and the number of steps is directly proportional to the deviation of the belt. For example, as shown in FIG. 7, ideally the microprocessor 54 is programmed such that small deviations to the left or right of the centered position, represented by line A, do not result in actuation of the stepper motor 32 (FIG. 6). This zone of no movement is represented by the length of line B. As the belt deviates beyond this zone, the number of steps required to correct the deviation increases and is shown by the line segments C, C'.

For even larger deviations from the centered position, the number of steps required of the stepper motor 32 increases more rapidly, and is shown by line segments D, D'. It should be noted that the line segments to the left of line A represent the increasing number of steps rquired of the stepper motor 32 to rotate the output shaft 33 in a first direction, such as clockwise to shift the tracking roller 20. The line segments to the right of line A represent the increasing number of steps required of the stepper motor to rotate the output shaft 33 in an opposite sense to shift the tracking roller 20 in an opposite direction.

Experimentation with prototypes of the embodiment shown in the figures indicates that the greater the lateral tracking force applied by the tracking mechanism 18 (FIG. 1), the less time is required to effect a lateral movement of the belt. Accordingly, it is believed that a time delay introduced by the timer 60 between counting operations should vary inversely with the number of steps of the stepper motor 30. For example, it is believed that the counting procedure should take place approximately every 10 seconds, as shown by lines E, E' for relatively small deviations, while time delays of about 2 seconds are required for greater deviations, as shown by line segments F, F'. For counts which indicate that the belt is within the desired zone B, time delays of 12 to 15 seconds are sufficient and are indicated by line segments G, G'.

Figure 8:
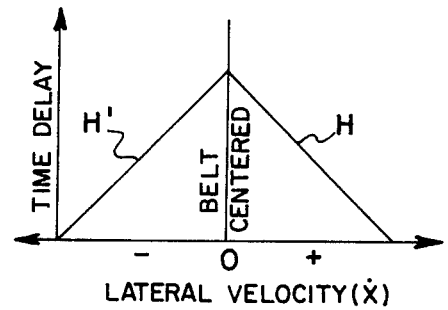
FIG. 8 is a graph showing the relation between the relative lateral velocity of the belt and the time delay introduced by the microprocessor of the invention.

During startup of the system after a new belt has been installed, the time delay should be made a function of both the relative lateral location of the belt and the rate of lateral motion. Time delay, TD, may be expressed as $$TD = f(x) + g(\dot{x})$$

where f(x) is a function of the displacement x, and $g(\dot{x})$ is a function of the rate of lateral motion $\dot{x}$. The function f(x) is represented by lines E, F, G, E', F', G' in FIG. 7, and the function $g(\dot{x})$ is represented by lines H, H' in FIG. 8.

As a result, the amount of time delay would be relatively small even for relatively small displacements of the belt should the rate of belt displacement be relatively high. It is preferable that, during system startup, the belt be operated at a relatively slow speed to allow the apparatus sufficient time to center the belt.

It is within the scope of this invention to program the microprocessor to warn an operator and/or shut the drive roller 14 down when a predetermined amount of lateral displacement is reached.

While the form of apparatus herein described constitutes a preferred embodiment of the invention, it is to be understood that the invention is not limited to this precise form of apparatus, and that changes may be made therein without departing from the scope of the invention.

What is claimed is:

1. In a belt system of the type having a transparent belt entrained about driving and support rollers, an improved alignment apparatus comprising:
    a plurality of opaque flags positioned along said belt at equal distances from an edge thereof, each of said flags shaped to taper in length along a dimension transverse to said belt;
    light source means for directing a beam of light through said belt such that said beam is broken by said flags as said belt moves about said rollers;
    light sensor means fixed on an opposite side of said belt from said light source means for detecting transmission of said beam through said belt within a window narrower in width than a width of said flags, said window positioned such that the length of said flags move thereacross as said belt moves about said rollers, and for generating a first signal so long as one of said flags obscures said beam from said window;
    encoder means for sensing movement of said belt about said rollers and for generating pulses in response thereto having a frequency proportional to a rate of movement of said belt;
    tracking means for adjusting the position of said belt laterally relative to said support rollers; and
    control means for counting said pulses generated during a period when said first signal is generated, and for generating a second signal, proportional to the total of said pulses which are counted during the traverse of one of said flags across said window, to actuate said tracking means.

2. The belt system of claim 1 wherein said control means includes means for introducing a time delay of a selected duration between successive counting operations by said control means.

3. The belt system of claim 2 wherein said tracking means includes a tracking roller engaging said belt and pivotally and rotatably attached at an end thereof to a support, an elongated arm pivotally attached at an end thereof to a support and supporting an opposite end of said tracking roller, and stepper motor means having a threaded output shaft engaging said arm such that rotation of said output shaft displaces said arm and said roller.

4. The belt system of claim 3 wherein said tracking means includes a stepper motor drive circuit communicating with said control means and connected to said stepper motor such that said stepper motor drive actuates said stepper motor to rotate said shaft an amount corresponding to said second signal.

5. The belt system of claim 4 wherein said second signal is proportional to an amount of lateral deviation of said belt relative to said rollers.

6. The belt system of claim 5 wherein said time delay introducing means introduces a time delay which varies inversely in duration to an amount of lateral deviation of said belt relative to said rollers.

7. The belt system of claim 5 wherein said time delay introducing means introduces a time delay which varies in duration inversely to an amount of lateral deviation of said belt relative to said rollers, and inversely to an amount of lateral velocity of said belt relative to said rollers.

* * * * *